Figure 1:
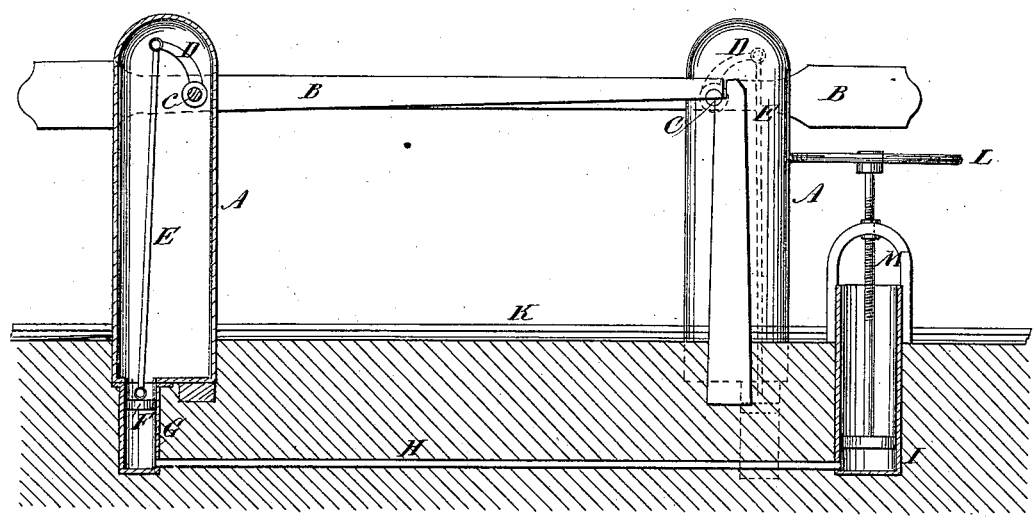
Figure 2:
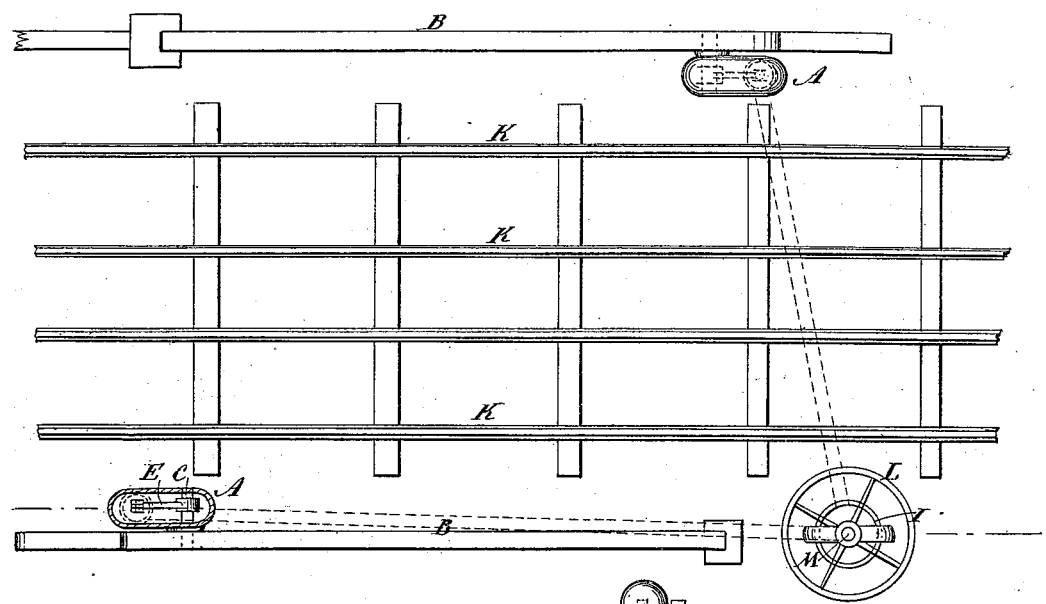
Figure 3:
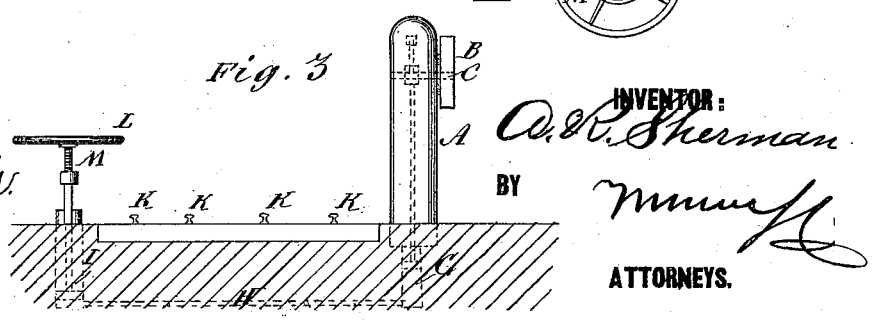

A. R. SHERMAN.
GATE OPERATING MECHANISM.

No. 186,763. Patented Jan. 30, 1877.

WITNESSES:
C. Neveux
J. Goethals

INVENTOR:
A. R. Sherman
BY
ATTORNEYS.

UNITED STATES PATENT OFFICE.

ALBERT R. SHERMAN, OF NATICK, RHODE ISLAND.

IMPROVEMENT IN GATE-OPERATING MECHANISMS.

Specification forming part of Letters Patent No. 186,763, dated January 30, 1877; application filed May 16, 1876.

*To all whom it may concern:*

Be it known that I, ALBERT R. SHERMAN, of Natick, in the county of Kent and State of Rhode Island, have invented a new and Improved Gate-Operating Mechanism, of which the following is a specification:

The object of my invention is to provide a simple and effective apparatus for springing and closing gates for railroad-crossings and other places. It consists, essentially of a piston-rod connected to the gate so as to swing it open and shut. Said piston works in a cylinder open at one end to the atmosphere, and connects at the other end, by means of a tube with a pump for forcing a liquid or fluid substance against the piston, so that it is moved in one direction or the other to operate the gate both ways, substantially as hereinafter set forth.

The apparatus is more particularly designed for working railroad-crossing gates which are arranged in pairs, one being on each side of the railway, and sometimes two pairs being used, one on each side of the railway, all of which may be worked by one pump or other contrivance for working the liquid, by merely connecting the cylinder of each gate to the pump by a tube, for the liquid to flow to and fro between them. Oil, glycerine, detrine, or any other liquid or fluid substance which does not freeze in ordinary winter temperature may be used; or, by sinking the apparatus in the ground below frost, water may be used.

The pump may be located in the station-house any convenient distance from the gate; and it may connect with any number of gates in different directions by only one pipe to each, or, with two or more gates in the same direction, by one piston, and closed at the bottom, and connected, by the tube H, with a pump, I, for forcing liquid or fluid into it and withdrawing it again, the pump being charged with a sufficient quantity of the liquid or fluid to work the gate or gates with which it is connected by driving it forward and sucking it backward.

The posts are preferably hollow, and the crank and connecting-rod arranged inside; but they are not essentially so.

The pipes H pass under the roadway in the ground, and also under the railway, in connection with the opposite gates; and the pump and the other cylinders may, if preferred, be set down in the ground below danger of frost.

The gates are counterbalanced, or nearly so, requiring but very little force to operate them.

The pump, in this example, is represented as being worked by a hand-wheel, L, and screw-rod M; but a lever or other approved means may by used. K represents the rails across which the roadway lies which is to be closed by the gates.

Having thus described my invention, what I claim as new, and desire to secure by Letters Patent, is—

The combination, with a gate, substantially as described, of a piston, a cylinder, open at one end, a pump, and a pipe for connecting said cylinder and pump, the piston being suitably connected to the gate to operate it by a reciprocating movement, as set forth.

ALBERT R. SHERMAN.

Witnesses:
T. B. MOSHER,
ALEX. F. ROBERTS.